United States Patent
Norman

(10) Patent No.: US 11,490,731 B2
(45) Date of Patent: Nov. 8, 2022

(54) MODULAR ARTIST STUDIO EASEL SYSTEM

(71) Applicant: Reginald Norman, Denver, CO (US)

(72) Inventor: Reginald Norman, Denver, CO (US)

(*) Notice: Subject to any disclaimer, the term of this patent is extended or adjusted under 35 U.S.C. 154(b) by 219 days.

(21) Appl. No.: 16/949,071

(22) Filed: Oct. 13, 2020

(65) Prior Publication Data

US 2021/0106137 A1 Apr. 15, 2021

Related U.S. Application Data

(60) Provisional application No. 62/914,677, filed on Oct. 14, 2019.

(51) Int. Cl.
| | | |
|---|---|---|
| *A47B 97/08* | (2006.01) | |
| *F16M 11/22* | (2006.01) | |
| *F16M 11/10* | (2006.01) | |

(52) U.S. Cl.
CPC ............. *A47B 97/08* (2013.01); *F16M 11/10* (2013.01); *F16M 11/22* (2013.01)

(58) Field of Classification Search
USPC ......... 248/444, 447, 447.1, 447.2, 448, 454, 248/457, 458, 149, 161
See application file for complete search history.

(56) References Cited

U.S. PATENT DOCUMENTS

| | | | |
|---|---|---|---|
| 3,226,077 A | | 12/1965 | Killen |
| 3,231,230 A | | 1/1966 | Mueller |
| 3,980,267 A | | 9/1976 | Palmer |
| 4,095,893 A | | 6/1978 | Handsman |
| 4,109,892 A | * | 8/1978 | Hartung ................. A47B 97/04 248/458 |
| 4,134,614 A | * | 1/1979 | Fielding, Sr. ........ A47B 83/008 248/458 |
| 4,165,856 A | | 8/1979 | Wiseheart |
| 4,753,408 A | * | 6/1988 | Wailes ................... H04R 1/026 248/161 |
| 4,856,749 A | | 8/1989 | Habermann |
| 5,242,145 A | | 9/1993 | Linnell |
| 5,725,192 A | * | 3/1998 | Cloninger .............. A47B 97/04 248/458 |
| 6,267,345 B1 | * | 7/2001 | Turner ................... A47B 97/04 248/455 |
| 7,380,765 B2 | | 6/2008 | Shiff |
| 7,455,275 B1 | * | 11/2008 | Astadan ................. A47B 97/08 248/463 |

(Continued)

*Primary Examiner* — Alfred J Wujciak
(74) *Attorney, Agent, or Firm* — Trenner Law Firm, LLC; Mark D. Trenner

(57) ABSTRACT

An example modular artist studio easel system includes a first mast member pivotally attached to first base member, and a second mast member pivotally attached to a second base member. Support arms are attached between the base members and the mast members. Cross members are slidably connected between the first mast member and the second mast member to adjust a width between the first mast member and the second mast member. A first back support is mounted to the first mast member, and a second back support is mounted to the second mast member, for supporting at least one canvas thereon. A first upper edge support and a first lower edge are mounted on the second back support. A second upper edge support and a second lower edge are mounted on the second back support.

20 Claims, 16 Drawing Sheets

(56) References Cited

U.S. PATENT DOCUMENTS

| | | |
|---|---|---|
| 7,543,790 B2 | 6/2009 | Starcher |
| 7,717,393 B2 | 5/2010 | Edgmon et al. |
| 8,353,490 B2 * | 1/2013 | Spinelli ............... F16M 11/22 |
| | | 211/175 |
| 2007/0040089 A1 | 2/2007 | Shiff |
| 2009/0242723 A1 | 10/2009 | Starcher |
| 2014/0124631 A1 * | 5/2014 | Olander ............... A47B 23/044 |
| | | 248/176.1 |
| 2014/0263922 A1 * | 9/2014 | Hickman ............... A47B 97/08 |
| | | 248/447.1 |
| 2020/0240575 A1 * | 7/2020 | Lee ................... F16M 13/022 |

* cited by examiner

MODULAR ARTIST STUDIO EASEL SYSTEM

PRIORITY CLAIM

This application claims the priority filing benefit of U.S. Provisional Patent Application No. 62/914,677 filed on Oct. 14, 2019 titled "Modular Artists Studio Easel System of Reginald Norman, hereby incorporated by reference for all that is disclosed as though fully set forth herein.

BACKGROUND

An easel serves to support a canvas for an artist (e.g., a sketch artist or painter) while the artist works. The artist typically stands in front of the easel, but may also sit. The easel may support the canvas at an angle (e.g., about 10° to 30° relative to a vertical plane). An easel may also be used to display finished paintings, photographs, or other artwork.

Artists work on different size canvases. Some artists have stationary racks constructed that can be any set size to fit their particular canvas size. However, these racks are immobile and not flexible and may be too large or too small for canvas sizes other than the size for which it was designed to work with. Some artists lean the canvas against a wall, but this can cause the edge to slide on the floor and come out of adjustment. Some artists hang their canvas from the ceiling, a joist or beam. But this can leave the canvas hanging precariously balanced. None of these options provide support for the canvas on the ends or edges of the canvas outside of the central support structure of the easel.

DETAILED DESCRIPTION

Figure 1:
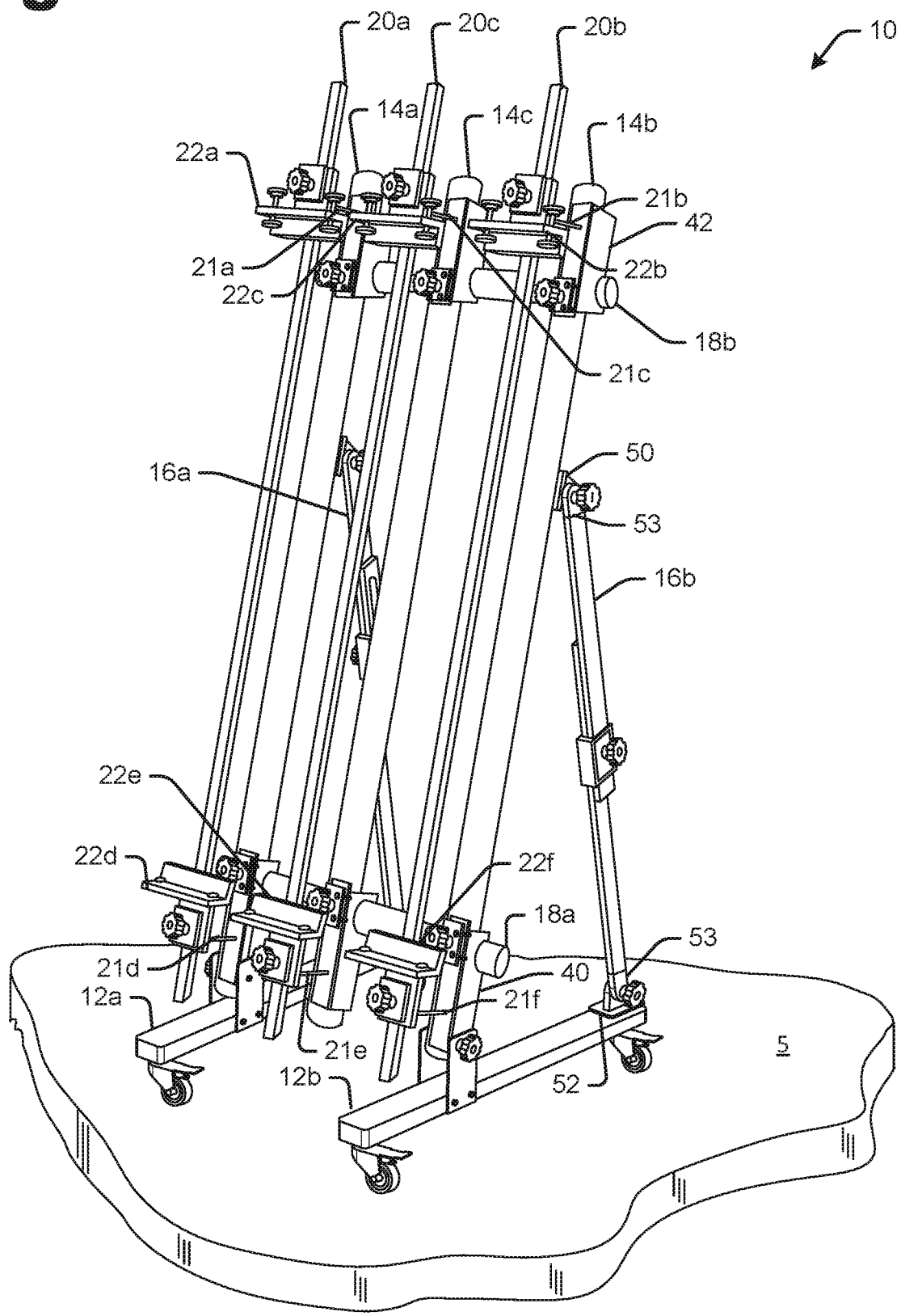
FIG. 1 is a front perspective view of an example modular artist studio easel system in a compressed or collapsed configuration.

A modular artist studio easel system is disclosed as it may be configured as a single canvas easel and as a multi-canvas (or larger or smaller size canvas) easel. The example modular artist studio easel system enables an artist to change sizes of stretched canvas formats. For example, the easel may be configured in a minimum size of about 6" (height) by 8" (width) and various sizes in between up to a maximum size of about 120" (height) by any or an "infinite" width, depending on the number of components added to the easel side(s).

While described herein as an artist studio easel system, it is noted that other end-use applications are also contemplated, e.g., for displaying signage. These and other end-use applications will be readily apparent to those having ordinary skill in the art after becoming familiar with the teachings herein. The scope of the claims is intended to protect all end-use applications.

An example modular artist studio easel system includes at least a first base member and a second base member. Each of the first base member and the second base member are positioned substantially parallel to one another and substantially horizontal to a foundation surface (e.g., the ground, a work surface, etc.). The example modular artist studio easel system also includes at least a first mast member and a second mast member. The first mast member is pivotally attached to the first base member, and the second mast member is pivotally attached to the second base member.

The example modular artist studio easel system also includes at least a first support arm and a second support arm. The first support arm is pivotally attached between the first base member and the first mast member, and the second support arm is pivotally attached between the second base member and the second mast member. The first support arm and the second support arm are adjustable in length to adjust an angle between the first mast member and the first base member and between the second mast member and the second base member.

The example modular artist studio easel system also includes at least a first cross member and a second cross member slidably connected between the first mast member and the second mast member to adjust a width between the first mast member and the second mast member.

The example modular artist studio easel system also includes at least a first back support mounted to the first mast member, and a second back support mounted to the second mast member. The first back support and the second back support are for supporting at least one canvas thereon.

The example modular artist studio easel system also includes at least a first upper edge support and a first lower edge. At least one of the first upper edge support and the first lower edge support is slidably mounted on the first back support to adjust a height for the canvas.

The example modular artist studio easel system also includes at least a second upper edge support and a second lower edge. At least one of the second upper edge support and the second lower edge support is slidably mounted on the second back support to adjust a height for the canvas.

In an example, an easel area is formed on the first and second back supports and between the upper and lower edge supports. The easel area accommodates different sizes and/or number of canvas thereon.

In an example, the module units can be linked together as wide as the artist may choose to support very large canvases. As such, the easel can grow as the artist's format sizes change (e.g., based upon the artist's desires). The example modular artist studio easel system can potentially be the only easel an artist will ever need to purchase for a studio situation. Changes can be readily accomplished by simply changing the width (length) of the top and bottom horizontal tube(s).

Before continuing, it is noted that as used herein, the terms "includes" and "including" mean, but is not limited to, "includes" or "including" and "includes at least" or "including at least." The term "based on" means "based on" and "based at least in part on."

The operations shown and described herein are provided to illustrate example implementations. It is noted that the operations are not limited to the ordering shown. Still other operations may also be implemented.

Figure 2:
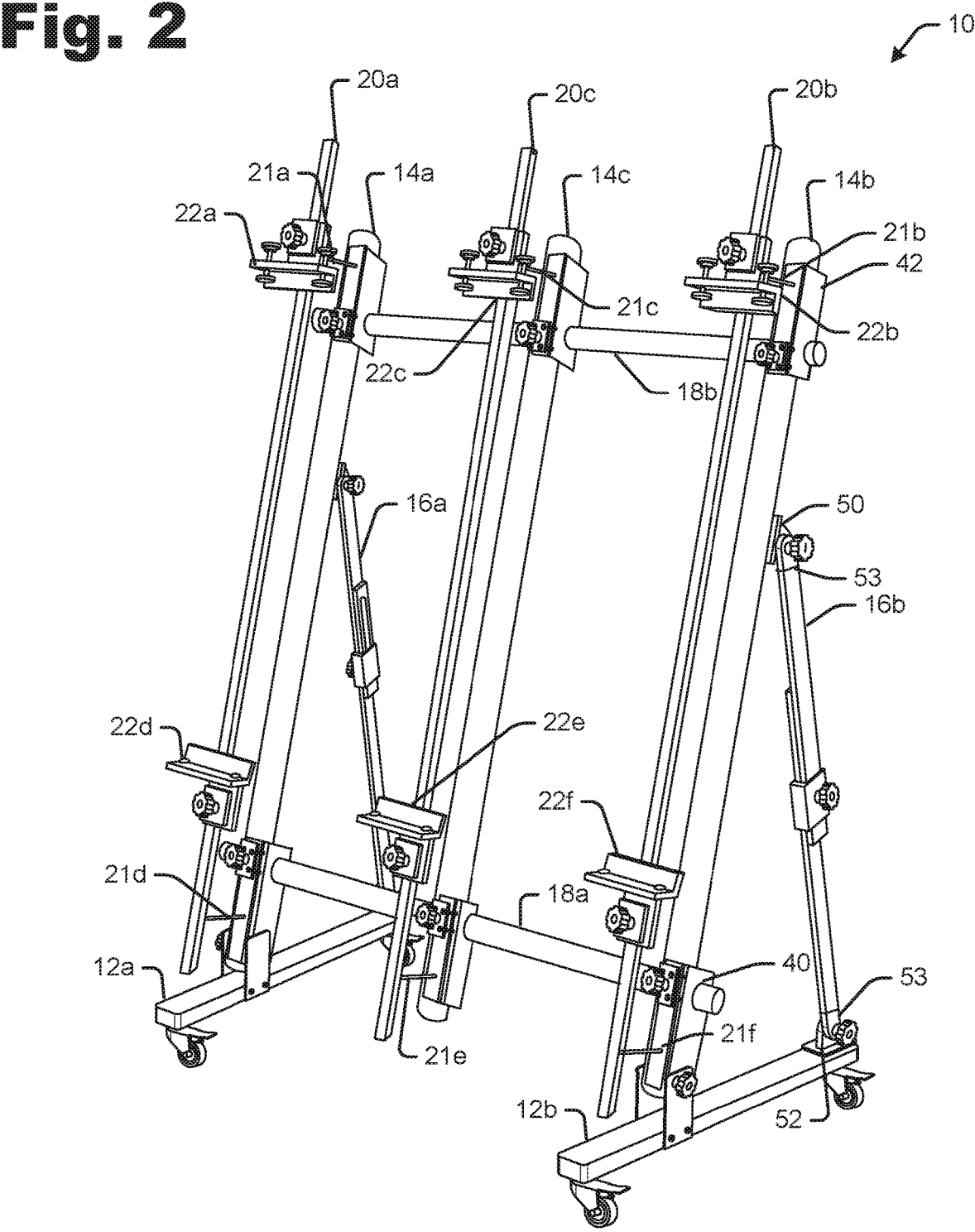
FIG. 2 is a front perspective view of an example modular artist studio easel system in a first expanded configuration.
Figure 3:
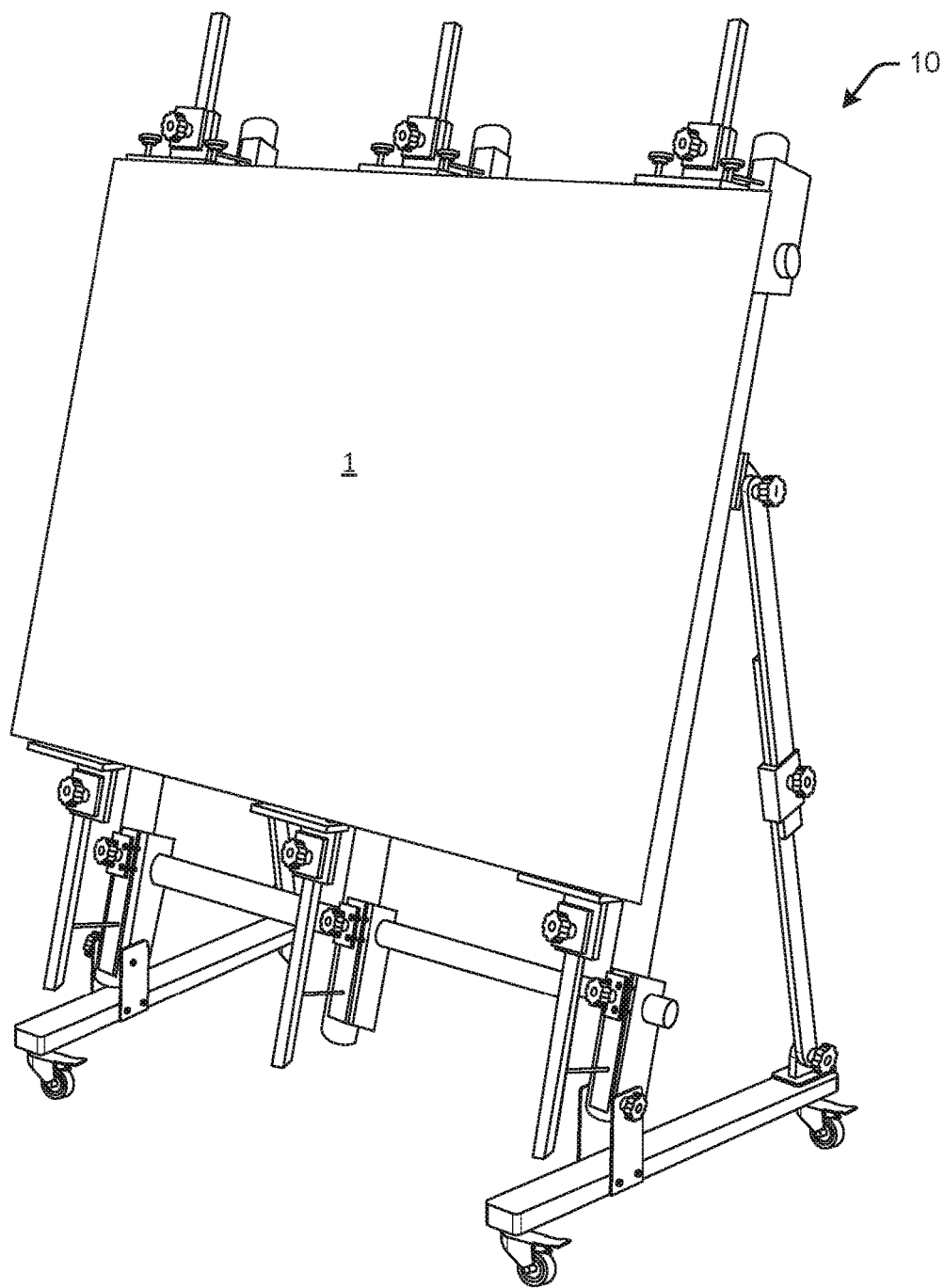
FIG. 3 shows a canvas installed on the example modular artist studio easel system in the first expanded configuration of FIG. 2.
Figure 4:
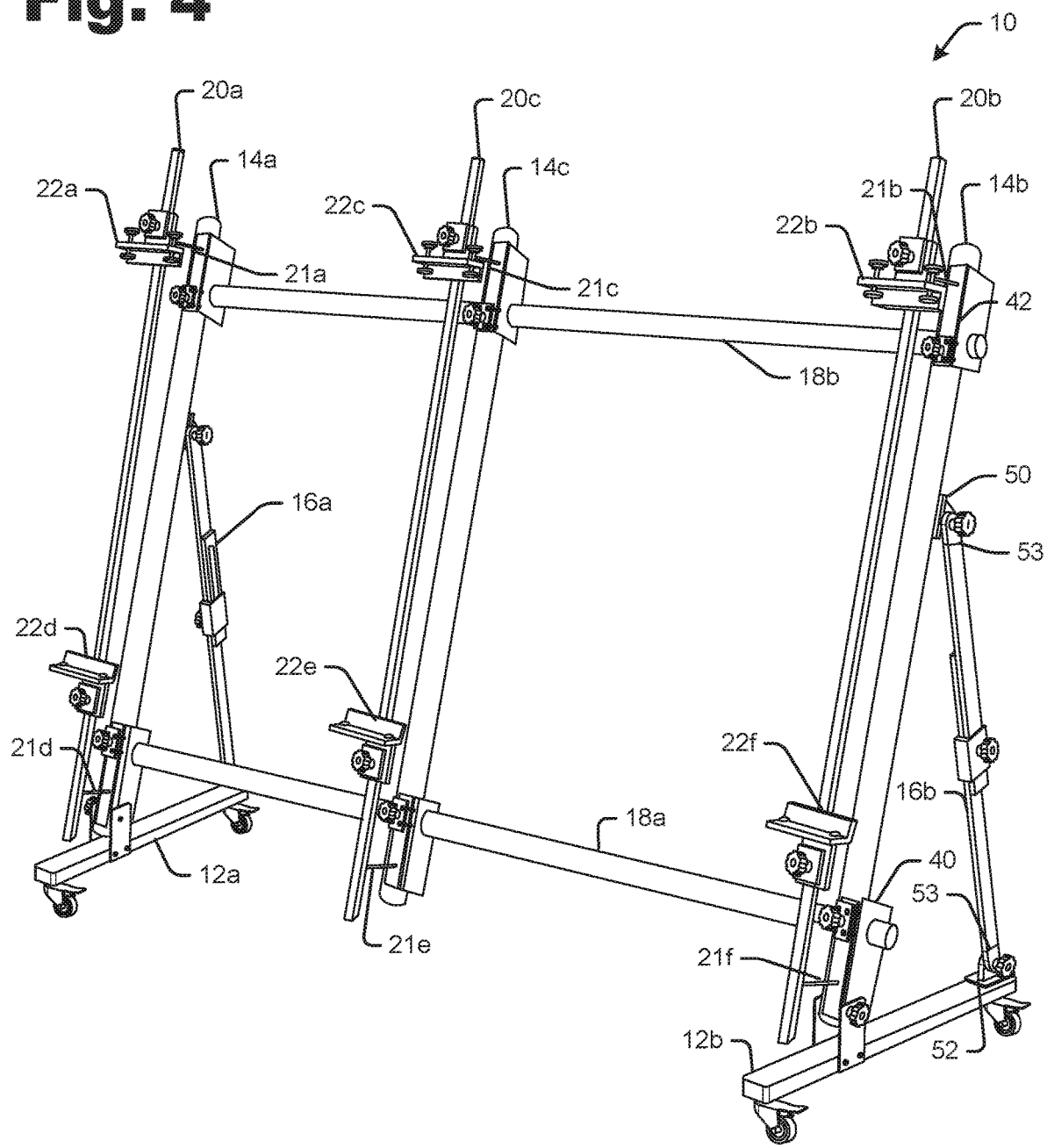
FIG. 4 is a front perspective view of an example modular artist studio easel system in a second expanded configuration.
Figure 5:
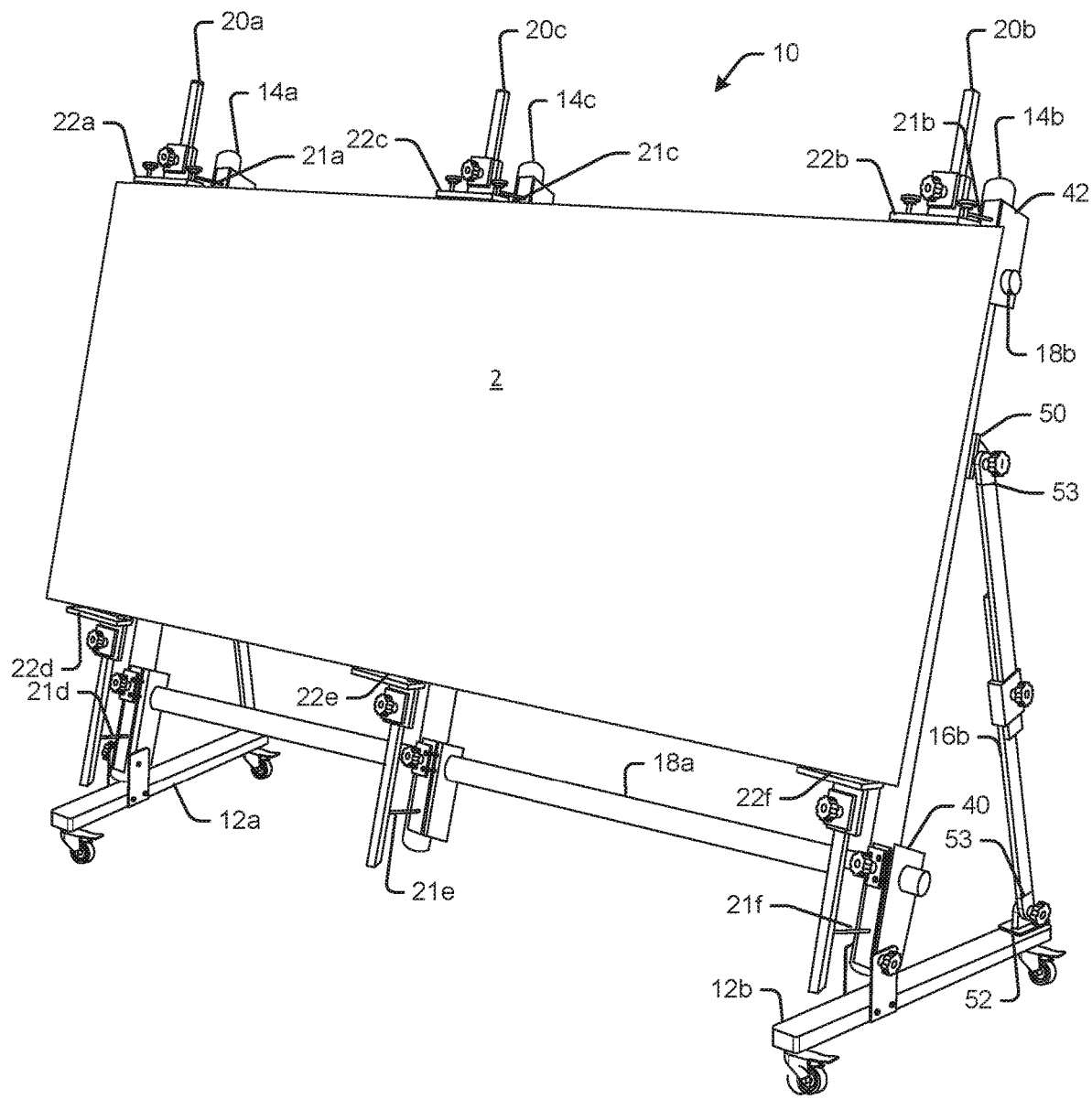
FIG. 5 shows a canvas installed on the example modular artist studio easel system in the second expanded configuration of FIG. 4.
Figure 6:
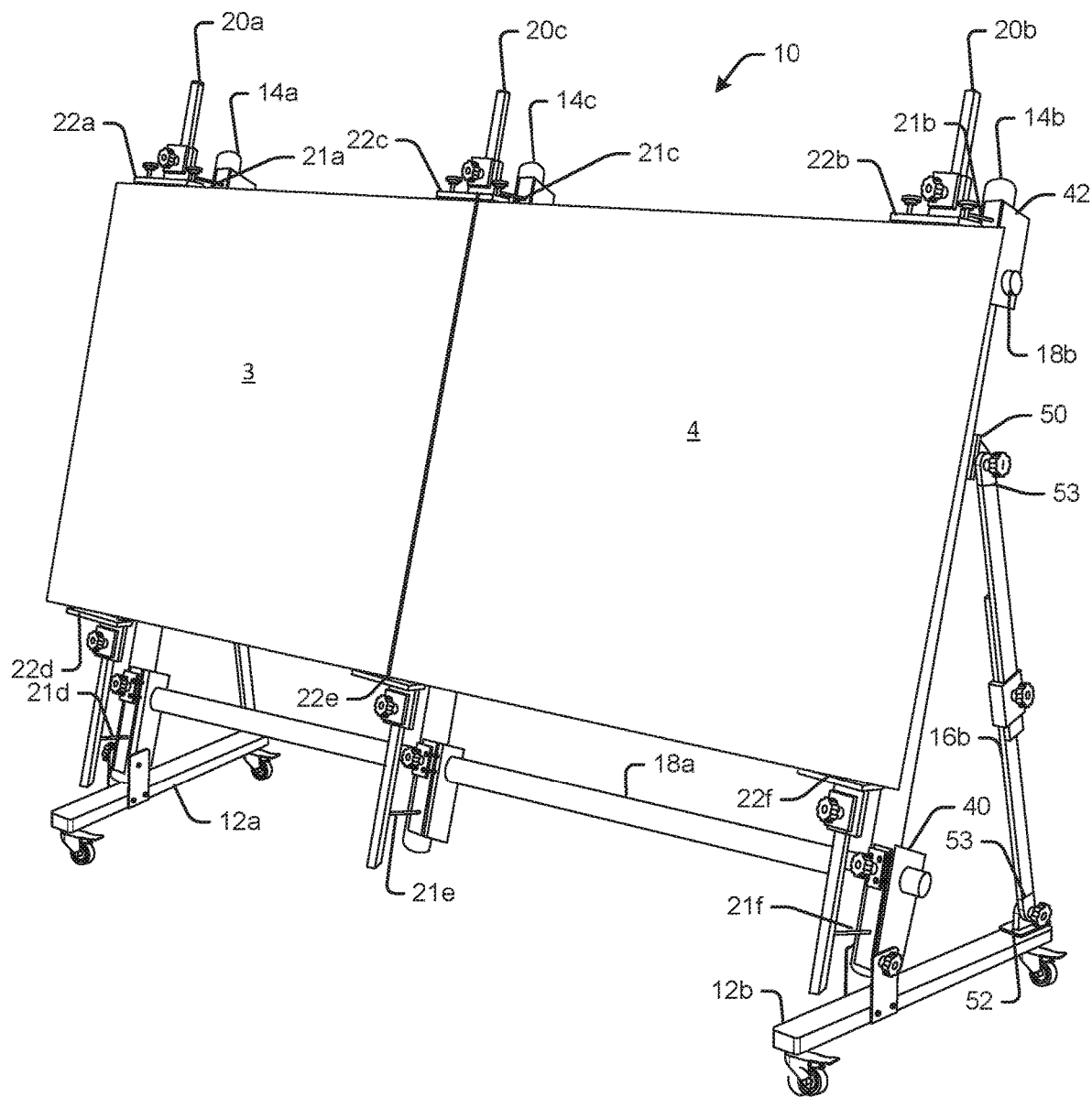
FIG. 6 shows multiple canvases installed on the example modular artist studio easel system in the second expanded configuration of FIG. 4.

FIG. 1 is a front perspective view of an example modular artist studio easel system 10 in a compressed or collapsed configuration. FIG. 2 is a front perspective view of the example modular artist studio easel system 10 in a first expanded configuration. FIG. 3 shows a canvas 1 installed on the example modular artist studio easel system 10 in the first expanded configuration of FIG. 2. FIG. 4 is a front perspective view of the example modular artist studio easel system 10 in a second expanded configuration. FIG. 5 shows a canvas 2 installed on the example modular artist studio easel system 10 in the second expanded configuration of FIG. 4. FIG. 6 shows multiple canvases 3 and 4 installed on the example modular artist studio easel system 10 in the second expanded configuration of FIG. 4.

It is noted that the example configurations shown in the drawings are only illustrative and not intended to be limiting. Indeed, the modular artist studio easel system is considered to be "modular." As used herein, the term "modular" means that any number of structural members and/or entire systems may be combined to configure the system for any suitable dimensions in both height and width to support any number and/or size of canvas (or multiple canvases). The canvases may be configured side-by-side (e.g., increasing the canvas area in width as illustrated in FIG. 6) and/or in a stacked relation (e.g., increasing the canvas area in height, not shown).

In an example, the modular artist studio easel system 10 is shown in FIG. 1 as it may be configured to include at least a first base member 12a and a second base member 12b. The modular artist studio easel system 10 also includes mast members 14a-c. In this example, a first mast member 14a is attached to the first base member 12a, and a second mast member 14b is attached to the second base member 12b. A third "floating" mast member 14c is also shown in this configuration. The third mast member 14c is said to be "floating" because it is not directly attached to a base member.

In an example, each of the base members 12a, 12b are positioned substantially parallel to one another and substantially horizontal to a foundation surface 5. The foundation surface may be the ground or other suitable surface, such as, but not limited to a studio floor, museum floor, gallery floor, stage, or even a workbench, table, platform, or other display surface. It is noted that the modular artist studio easel system 10 may be implemented for working on a canvas and/or display of the canvas.

It is noted that any number of base members and/or mast members may be provided. In addition, the mast members may be any suitable length. The mast members may be a fixed or variable length. For example, the mast members may be extendable (e.g., by connecting mast members end-to-end), and/or may be adjustable in length (e.g., telescoping).

The modular artist studio easel system 10 also includes at least a first support arm 16a and a second support arm 16b. The first support arm 16a is attached between the first base member 12a and the first mast member 14a. The second support arm 16b is attached between the second base member 12b and the second mast member 14b. Any number of support arms of any fixed or variable length may be provided.

In an example, the support arms 16a, 16b are adjustable in length to adjust an angle between the mast members 20a, 20b and the base members 12a, 12b. For example, the support arms 16a, 16b are pivotally attached between the base members 12a, 12b so that increasing the length of the support arms 16a, 16b will increase the angle toward 90 degrees, and decreasing the length of the support arms 16a, 16b will decrease the angle toward 0 degrees.

It is noted that any number of support arms may be provided. In addition, the support arms may be any suitable length. The cross members may be a fixed length, extendable (e.g., by connecting cross members end-to-end via couplers), and/or may be adjustable in length (e.g., as illustrated in the figures).

The modular artist studio easel system 10 also includes at least a first cross member 18a and a second cross member 18b. The cross members 18a, 18b may be slidably connected between the first mast member 14a and the second mast member 14b to adjust a width between the first mast member 14a and the second mast member 14b. The cross members 18a, 18b may also support the third (and/or other) mast member 14c.

It is noted that any number of cross members may be provided. In addition, the cross members may be any suitable length. The cross members may be a fixed length, extendable (e.g., by connecting cross members end-to-end with couplers), and/or may be adjustable to various lengths (e.g., telescoping).

The modular artist studio easel system 10 also includes at least a first back support 20a mounted to the first mast member 14a, and a second back support 20b mounted to the second mast member 14b. A third back support 20c is also shown in this configuration. The back supports 20a-c may be provided for supporting at least one canvas thereon (e.g., in an "easel area").

It is noted that any number of back supports may be provided. In addition, the back support members may be any suitable length. The back supports may be a fixed length, extendable (e.g., by connecting mast members end-to-end), and/or may be adjustable in length (e.g., telescoping).

In an example, the back supports are fixedly attached to the mast members (e.g., by spacers 21a-f). In other examples, the back supports may be adjustable and/or removably attached to the mast members.

The modular artist studio easel system 10 also includes at least a first upper edge support 22a and a first lower edge 22d mounted on the first back support 20a. The modular artist studio easel system also includes at least a second upper edge 22b support and a second lower edge 22f mounted on the second back support 20b. A third upper edge support 22c and a third lower edge 22e is also shown mounted on the third back support 20c.

The edge supports serve to retain the canvas (or multiple canvases) stationary on the modular artist studio easel system 10. In an example, the canvas may be rested on the lower edge supports 22a-c, and the upper edge supports slid against the upper edge of the canvas to secure the canvas therebetween.

In an example, at least one of the upper edge supports 22a-c and the lower edge supports 22a-c are slidably mounted on the back supports 20a-c to adjust a height and accommodate different height canvases.

It is noted that any number of upper and lower edge supports may be provided. Although the upper and lower edge supports are shown on each back support, in other examples edge supports need not be provided on all back supports. In addition, edge supports are shown individually on each back support. In another example, edge supports may extend between more than one back support.

In an example, an easel area (illustrated generally by the canvas 1 in FIG. 3, canvas 2 in FIG. 5, and canvases 3 and 4 in FIG. 6) is formed on the first and second back supports 20a,b and between the upper and lower edge supports 22a-c and 22d-f, respectively. The easel area may accommodate different sizes of the at least one canvas thereon (e.g., canvas 1 in FIG. 3 and larger canvas 2 in FIG. 5). The easel area may also accommodate a plurality of canvases thereon (e.g., canvases 3 and 4 in FIG. 6).

In an example, a plurality of locking mechanisms (e.g., threaded bolts with enlarged handles, as illustrated in the drawings) may be provided for the adjustable members to secure the height and width of the easel area.

Figure 7:
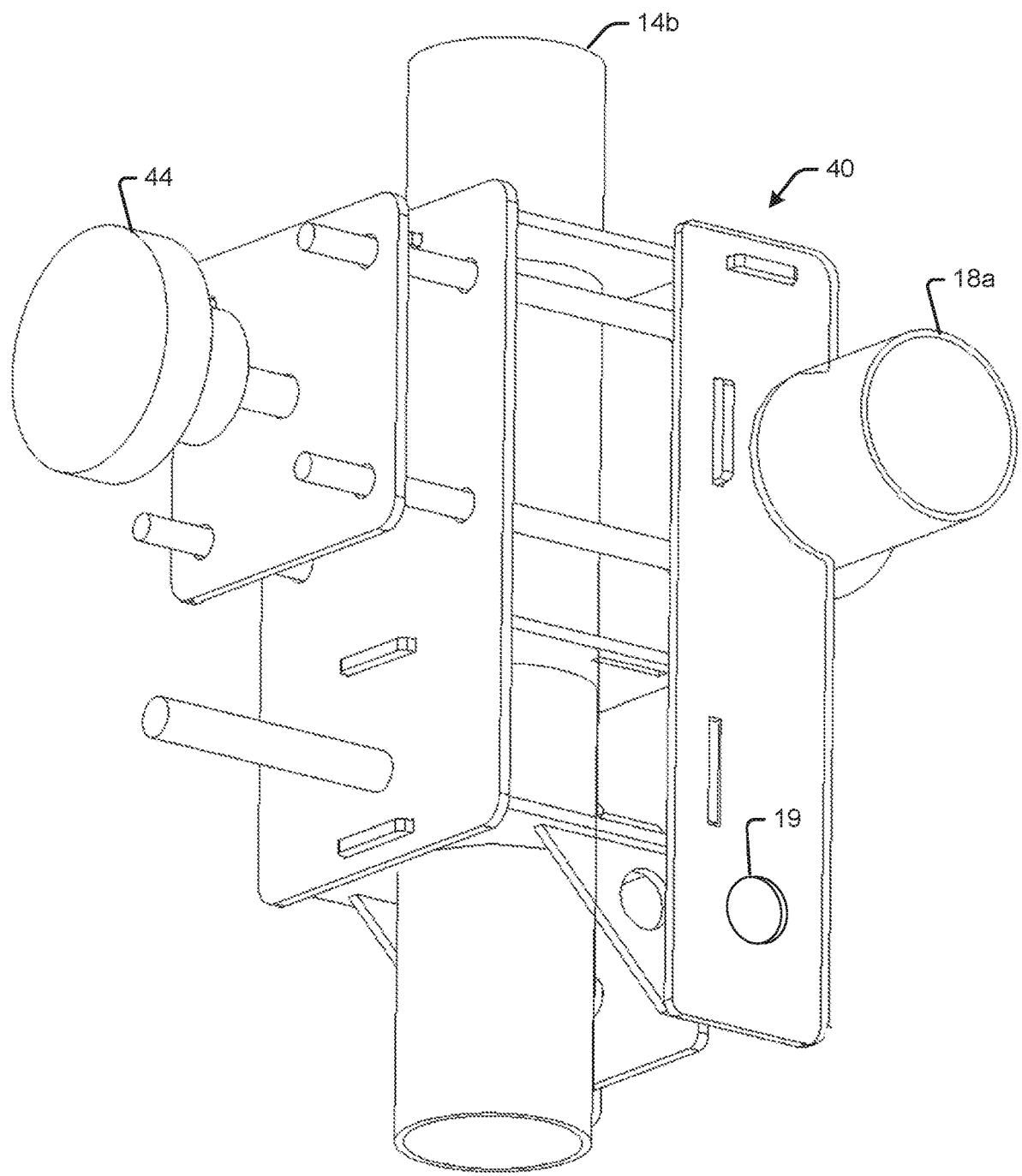
FIG. 7 is a detailed perspective view of an example lower interconnection assembly of the modular artist studio easel system.
Figure 8:
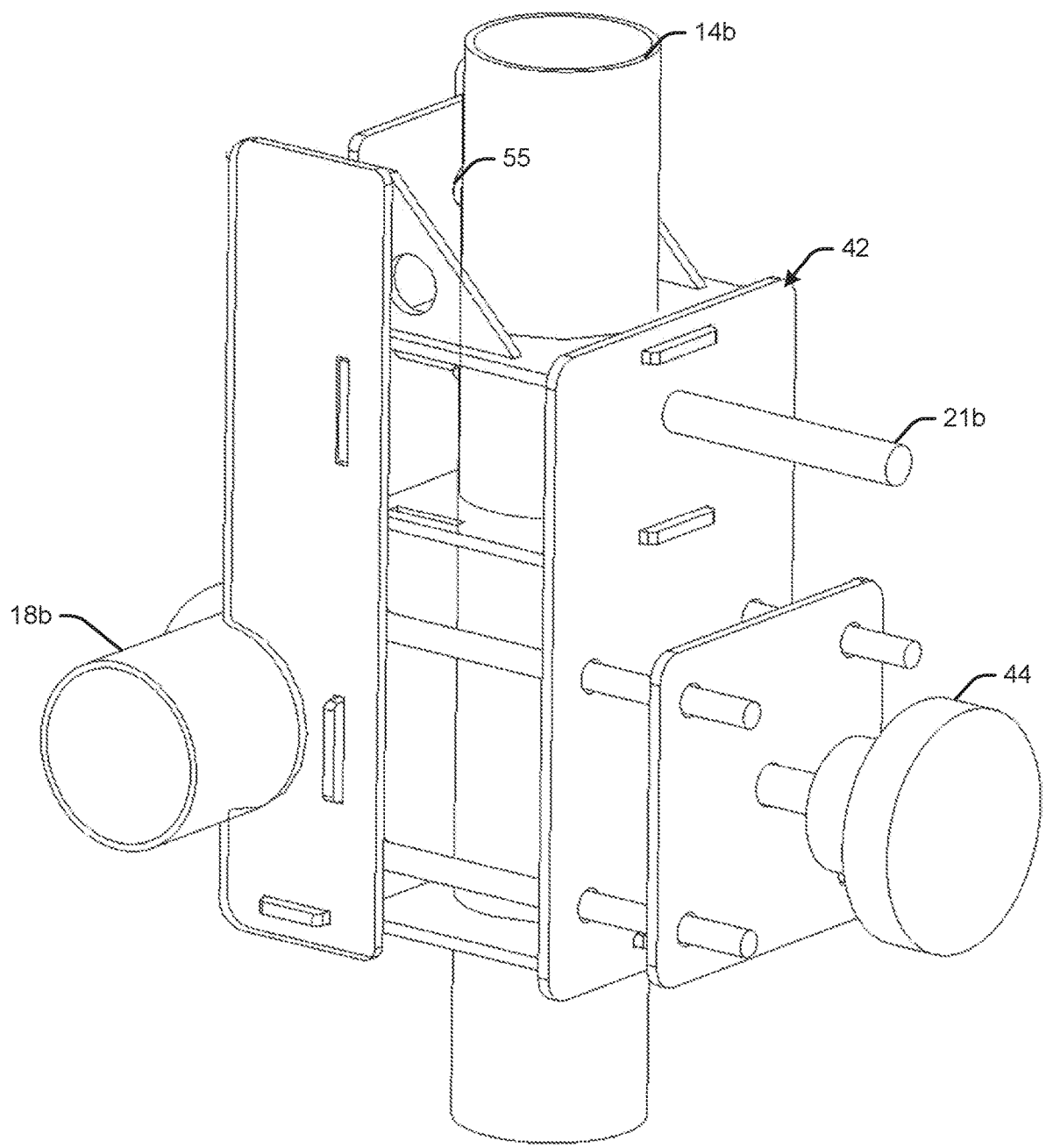
FIG. 8 is a detailed perspective view of an example upper interconnection assembly of the modular artist studio easel system.

The modular artist studio easel system 10 may include interconnection assemblies 40 and 42. FIG. 7 is a detailed perspective view of an example lower interconnection assembly 40. FIG. 8 is a detailed perspective view of an example upper interconnection assembly 42. In an example, the upper and lower interconnection assemblies 40, 42 are configured to mount the mast members 14a-c substantially perpendicular to the slidably mounted cross members 18a, 18b for adjustment relative to one another. An adjustment hand screw knob 44 may be provided on one or more of the interconnection assemblies 40, 42 to secure or hold the adjusted position of cross members 18a, 18b.

Figure 9:
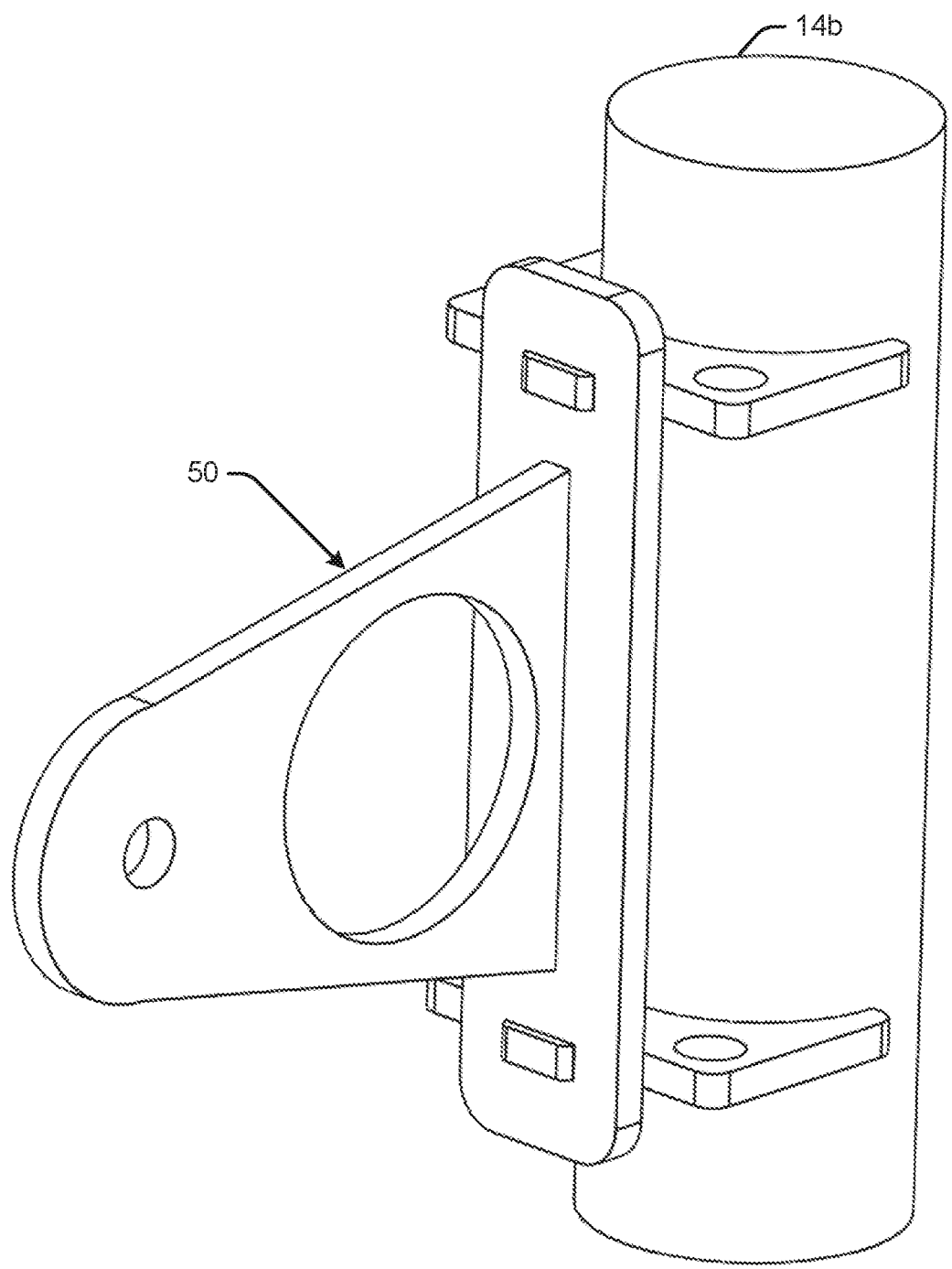
FIG. 9 is a detailed perspective view of an example first support arm bracket of the modular artist studio easel system.

FIG. 9 is a detailed perspective view of an example first support arm bracket 50 of the modular artist studio easel system 10. The bracket 50 may be configured to mount the support arms 16a, 16b to the masts 14a-c, e.g., as shown in FIGS. 1-6.

Figure 10:
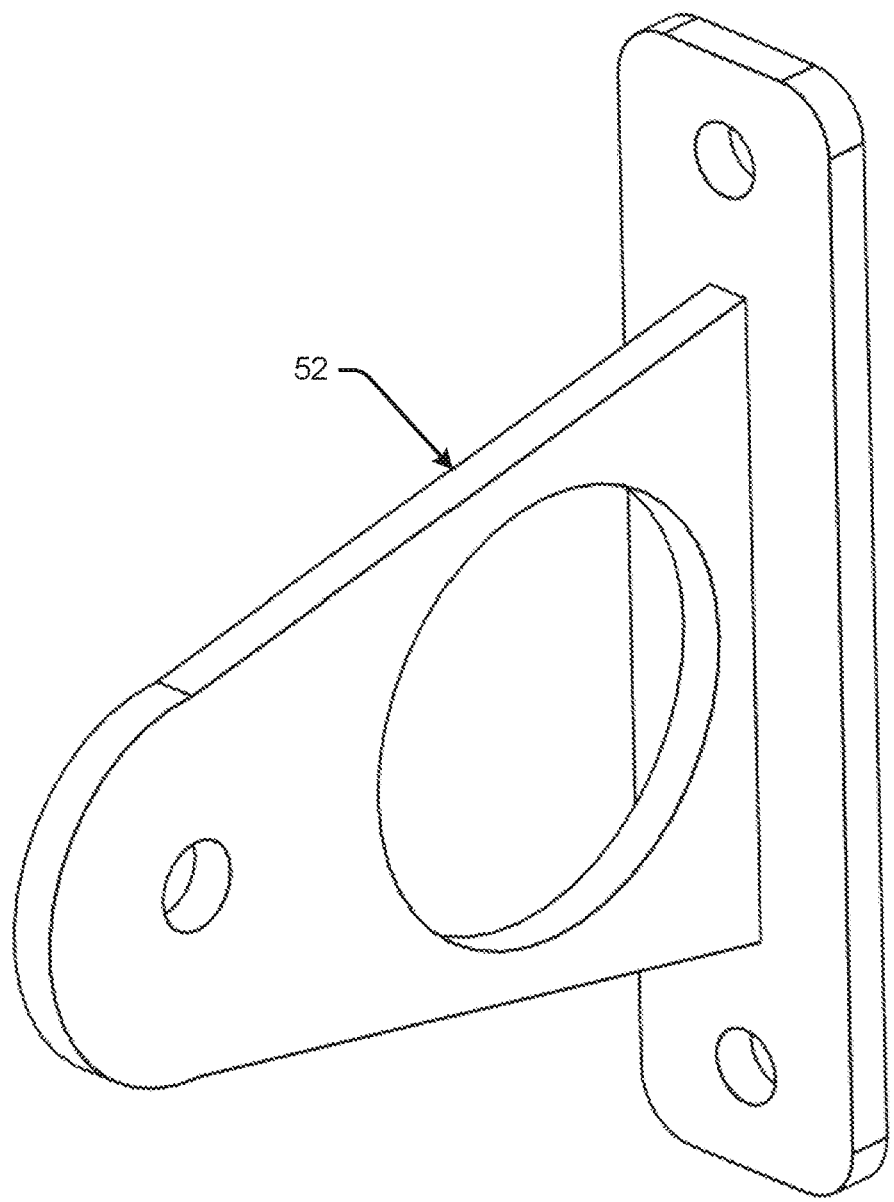
FIG. 10 is a detailed perspective view of an example second support arm bracket of the modular artist studio easel system.

FIG. 10 is a detailed perspective view of an example second support arm bracket 52 of the modular artist studio easel system 10. The bracket 52 may be configured to mount the support arms 16a, 16b to the bases 12a, 12b, e.g., as shown in FIGS. 1-6.

Figure 11:
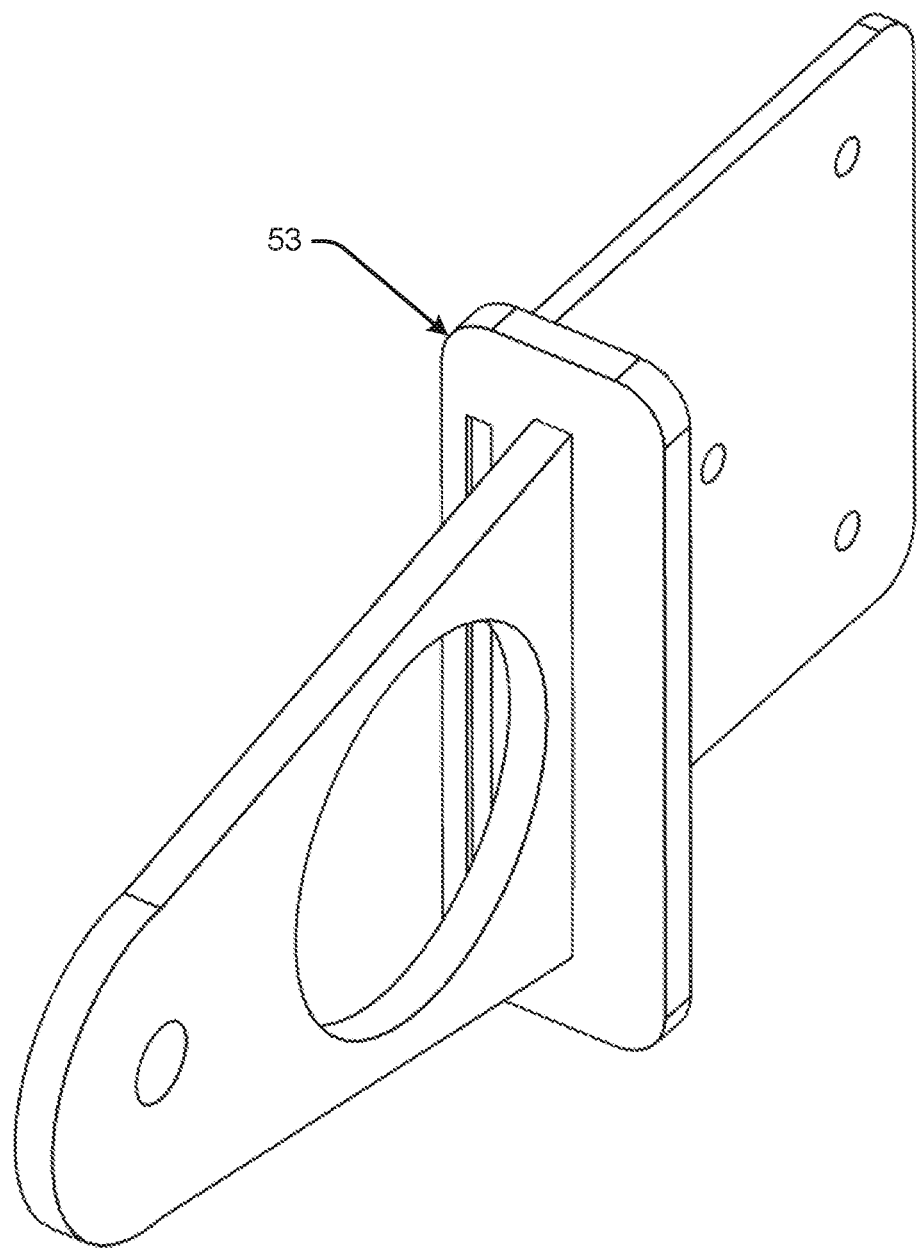
FIG. 11 is a detailed perspective view of an example third support arm bracket of the modular artist studio easel system.

FIG. 11 is a detailed perspective view of an example third support arm bracket of the modular artist studio easel system. The bracket 53 may be mounted on the support arms 16a, 16b and configured to connect with the bracket 50 to mount the support arms 16a, 16b to the masts 14a-c, e.g., as shown in FIGS. 1-6. The bracket 53 may also be mounted on the support arms 16a, 16b and configured to connect with the bracket 52 to mount the support arms 16a, 16b to the bases 12a, 12b, e.g., as shown in FIGS. 1-6.

In an example, the modular artist studio easel system 10 has mast members that slide horizontally along cross members that are sized from about 30 inches wide up to a maximum length of about 10 feet. Sections of 10 foot cross members can be extended in additional lengths of 1 foot up to additional lengths of 10 feet, multiple times, by inserting additional structural components. In an example, the widths can be expanded to lengths exceeding 30 feet and beyond with the insertion of additional structural components, e.g., at intermediate point(s) along the cross members 18a, 18b.

Additionally, if the end user desires to support multiple canvases at the same time, one or more intermediate mast with intermediate adjustable canvas support fixtures can be added to supports 20a-c to individually support multiple canvases in the vertical and horizontal positions for accommodating any sizes the artist chooses. The structural components may also be adjustable, allowing the user to change the angle with which they face the work.

The example modular artist studio easel system 10 provides stable support for canvases that are wider than a fixed size easel can adequately support. The structural components are adjustable along tubes to allow the artist the freedom to modify the width of the easel to meet his/her changing canvas format sizes.

It is noted that the structural components may be made of any suitable material (e.g., aluminum, wood, plastic, composite) and be any suitable shape (e.g., round, square or any other suitable shape). A square support offers advantages that the round support does not have. For example, the square support member automatically positions the adjustable canvas support fixtures parallel to each other. In addition, the length of the release mechanisms on the various fixtures may be shorter than those using the round vertical support member. This can help reduce turns of the knobs to release the fixtures from the vertical support member.

In an example, intermediate mast(s) can be added along the tube lengths to support wider canvases, as desired. The mass can be fitted with fixtures that allow the artist to vary the location of the canvas on the mast vertically. Additional masts can be added to support wider canvases.

In an example, additional adjustable canvas support fixtures can be added to individually support multiple canvases. As such, the modular artist studio easel system can be configured for any sizes the artist chooses, and/or if an artist wishes to paint multiple canvases on the easel together.

The easel can be sized to handle small canvases in height and width and can be sized to hold extremely large canvases (e.g., up to 120" in height and an infinite width). Modules sections of structural tubing can be added to any desirable length. The construction is simple and easy to assemble. When not needed, the easel can be easily made smaller and/or disassembled and stored.

It is noted that providing interchangeable components (e.g., masts, crossbars, bases, etc.), is one of the features that make the modular artist studio easel system 10 a "modular" system. This not only reduces manufacturing costs and part replacement, but also enables the end-user to readily assemble, configure, and reconfigure the system 10 with a minimum of components.

In an example, no tools are necessary to assemble and disassemble the easel system 10. In an example, a wrench may be provided to tighten couplers for the extension tubes (e.g., if the artist wishes to go beyond a 120" width).

While particular dimensions and sizes are mentioned herein, it is noted that the invention is not limited to any particular size, shape, and/or dimension. In addition, it is noted that while a minimum and maximum height and width are specified for purposes of illustration, other embodiments may also be provided with different minimum and/or maximum height and width (and/or no limits on height and width), without varying from the disclosure herein.

Before continuing, it is noted that the examples described herein are provided for purposes of illustration, and are not intended to be limiting. The structural members may be modified and/or other structural members may be included, as will be readily understood by those having ordinary skill in the art after becoming familiar with the teachings herein.

Figure 12:
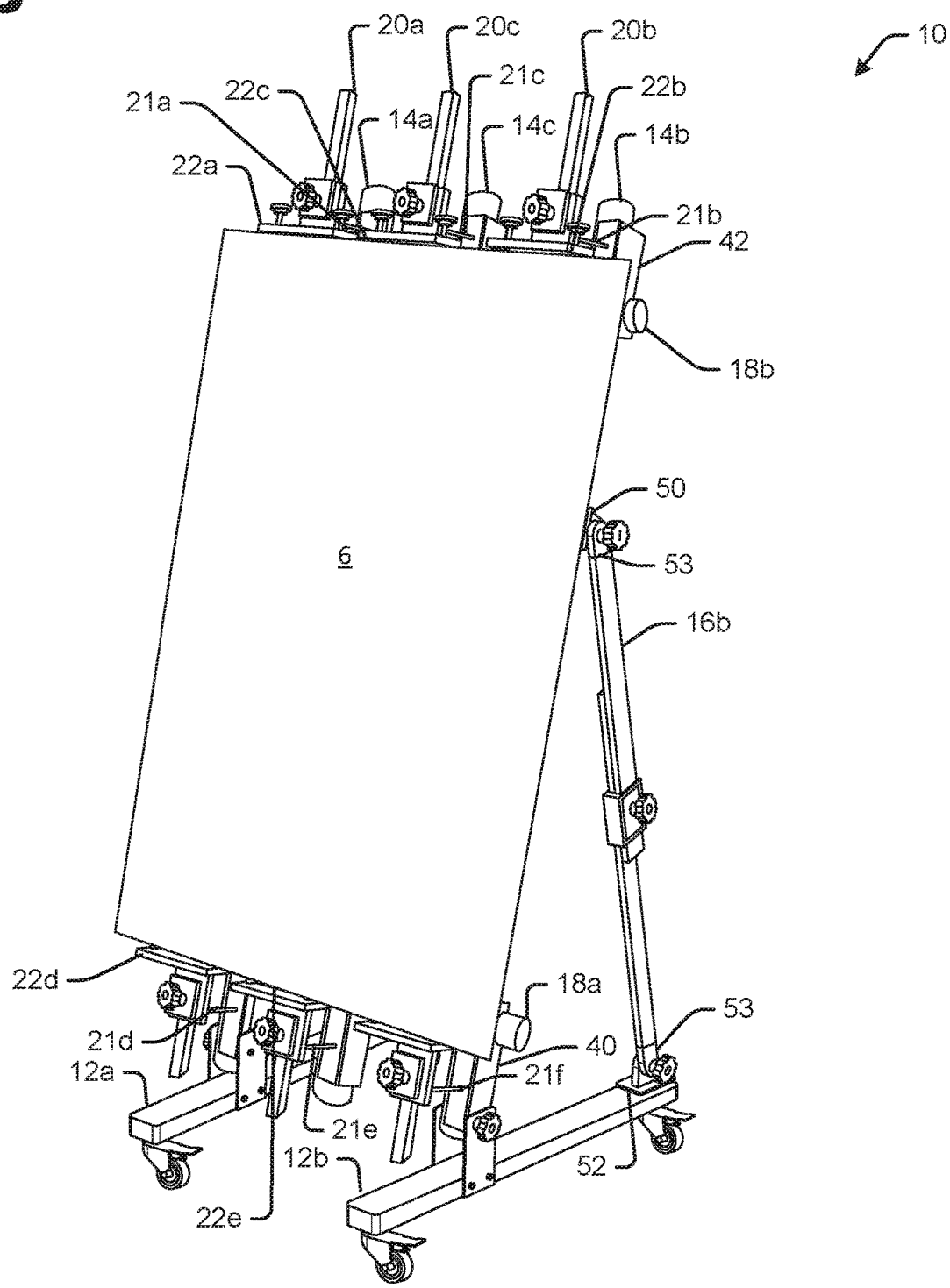
FIG. 12 shows a canvas installed on the example modular artist studio easel system in the first expanded configuration of FIG. 1.
Figure 13:
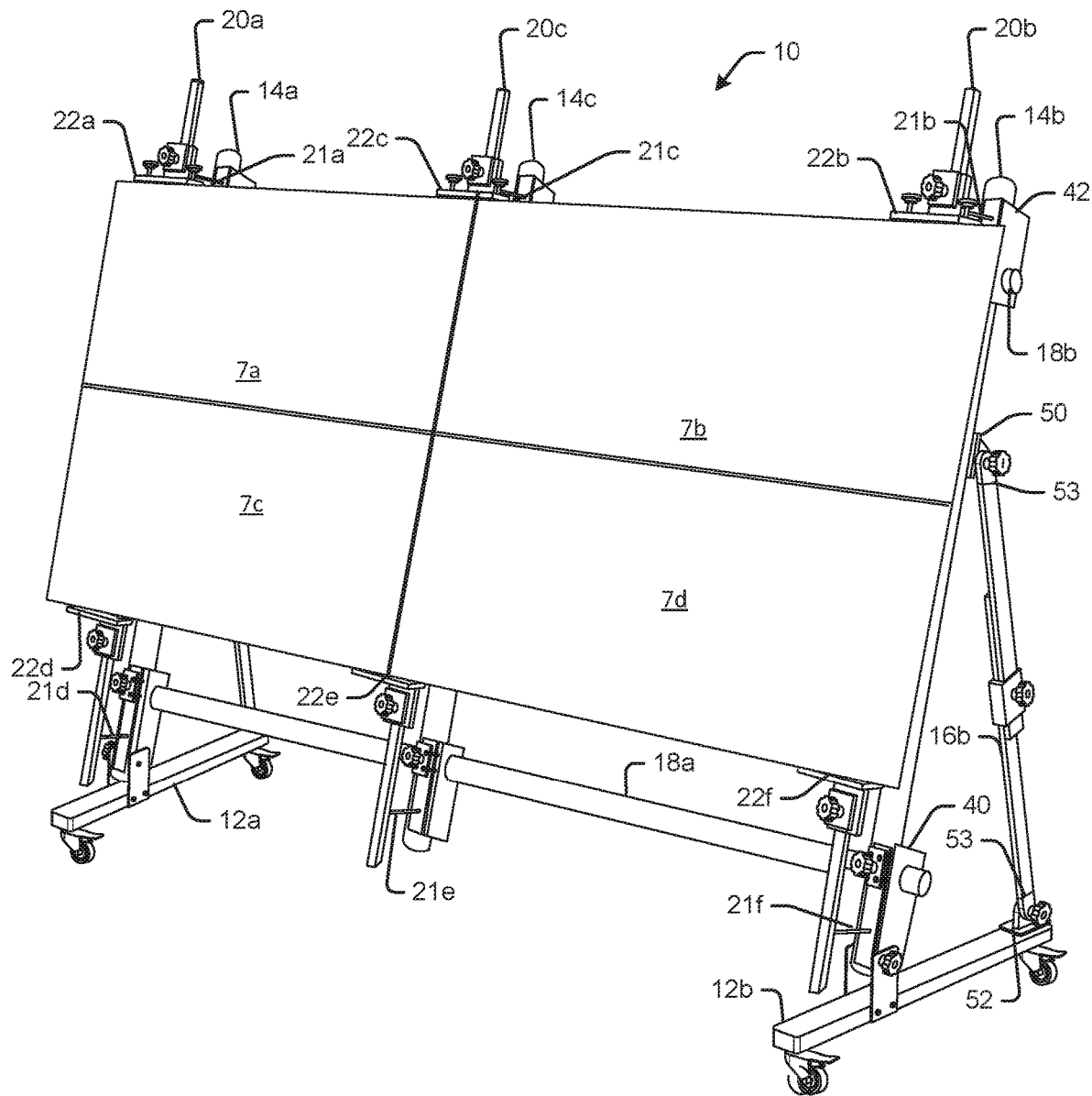
FIG. 13 shows multiple canvases installed both vertically adjacent and horizontally adjacent one another on the example modular artist studio easel system in the second expanded configuration of FIG. 4.

By way of illustration, FIG. 12 shows a canvas 6 installed on the example modular artist studio easel system 10 in the first expanded configuration of FIG. 1. FIG. 13 shows multiple canvases 7a-d installed both vertically adjacent and horizontally adjacent one another on the example modular artist studio easel system 10 in the second expanded configuration of FIG. 4.

Figure 14:
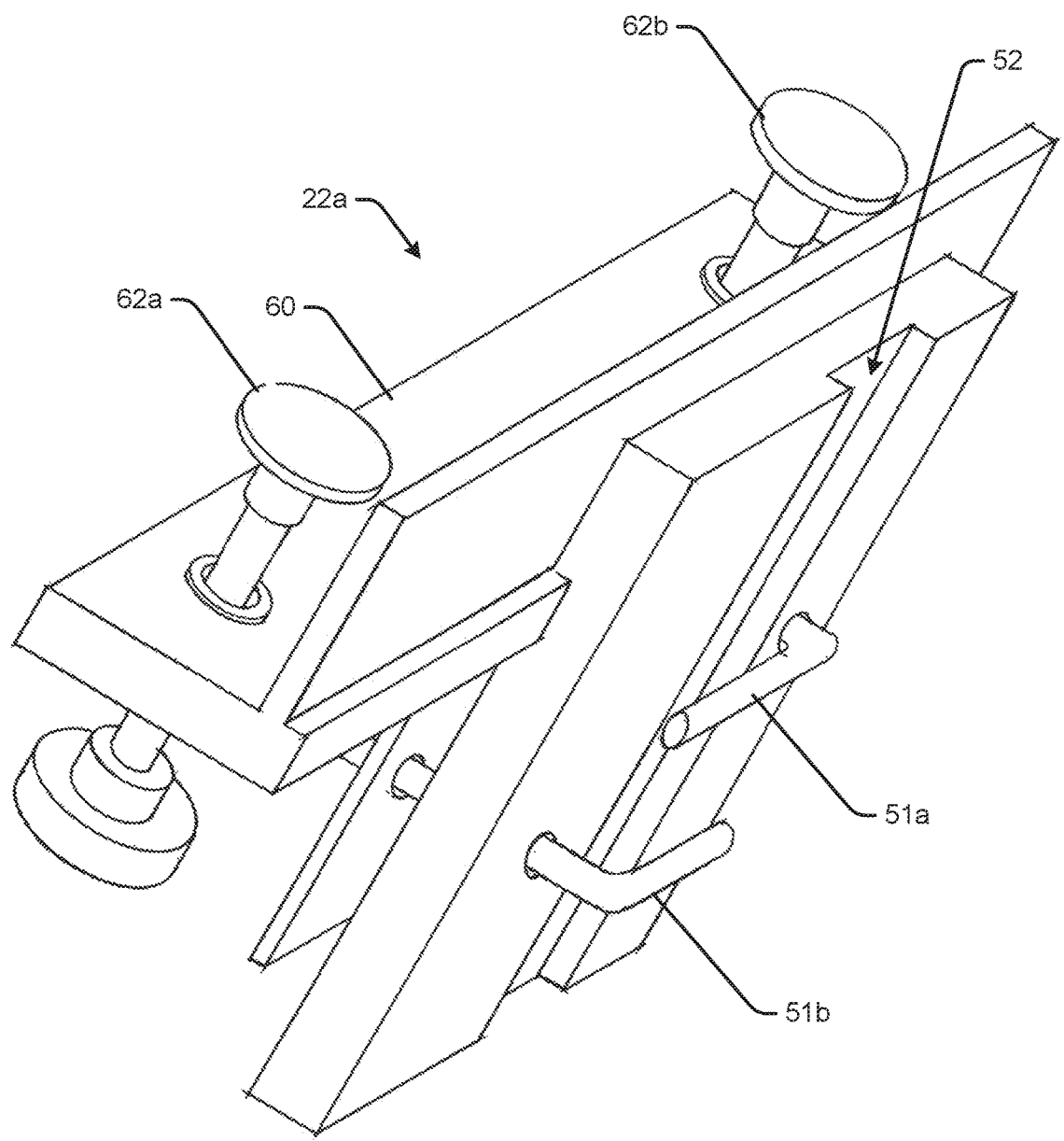
FIG. 14 is a detailed perspective view of an example edge support which may be mounted on the back support of the modular artist studio easel system.

FIG. 14 is a detailed perspective view of an example edge support (e.g., lower edge support 22d) which may be mounted on the back support (e.g., back support 20a) of the modular artist studio easel system 10. It is noted that although FIG. 14 is described with reference to one of the lower edge supports 22d, the other lower edge supports 22e, 22f are the same. In addition, upper edge supports 22d-f are also the same, but assembled in the opposite orientation (e.g., so that the ledge 60 supports the upper edge of the canvas). Interchangeable upper and lower edge supports is one of the features that make the modular artist studio easel system 10 a "modular" system.

The edge support may be mounted to the system 10 by brackets 51a, 51b. The brackets 51a, 51b are configured to be loosened to allow a back support (e.g., back support 20a) to slide through a channel 52 formed in the edge support. The edge support can be moved to a desired position along the length of the back support, and then be tightened to secure the edge support to the back support (e.g., via a handscrew knob under ledge 60 and not visible in FIG. 14; but see handscrew knob in FIG. 15).

In an example, the edge support includes a ledge 60 to support the edge of the canvas. For example, lower edge supports 20d-f support the lower edge of the canvas, and upper edge supports 20a-c have a ledge 60 that supports the upper edge of the canvas.

In an example, the edge support also includes threaded adjustment knobs 62a, 62b which may be tightened/loosened to secure against the edge of the canvas.

Figure 15:
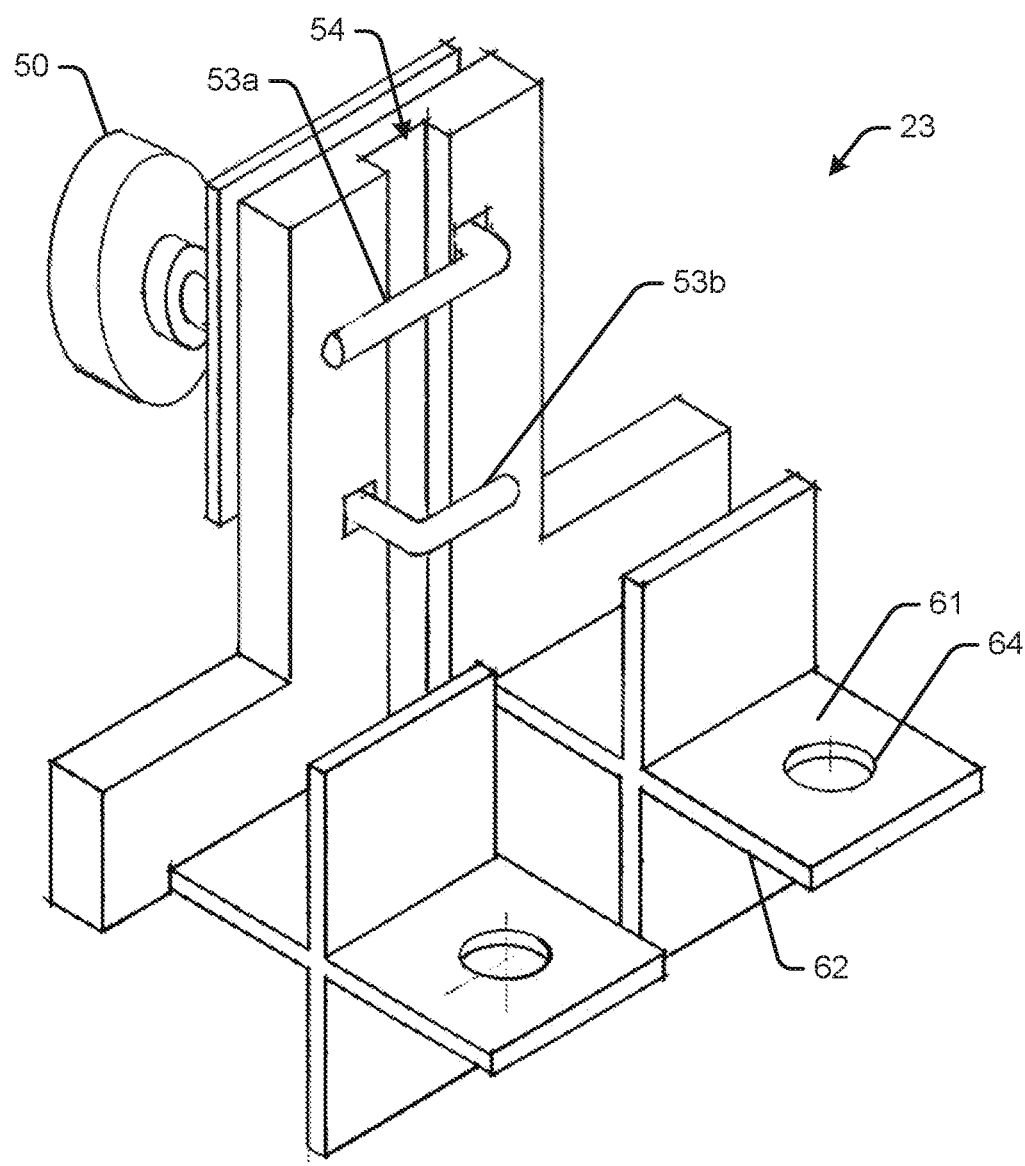
FIG. 15 is a detailed perspective view of an example intermediate edge which may be mounted which may be mounted between upper and lower edge supports on the back support of the modular artist studio easel system.

FIG. 15 is a detailed perspective view of an example intermediate edge support 23 which may be mounted between upper and lower edge supports 22a-f on a back support (e.g., back supports 20a-c) of the modular artist studio easel system 10. The intermediate edge supports provide both a lower ledge 61 and an upper ledge 62. The lower ledge 61 is configured to support the top edge of a canvas installed on the lower portion of the system 10 (e.g., canvas 7c and 7d in FIG. 13). The upper ledge 62 is configured to support the lower edge of a canvas installed on the upper portion of the system 10 (e.g., canvas 7a and 7b in FIG. 13).

The intermediate edge support(s) 23 may be mounted to the system 10 by brackets 53a, 53b. The brackets 53a, 53b are configured to be loosened to allow a back support (e.g., back support 20a) to slide through a channel 54 formed in the intermediate edge support 23. The edge support 23 can be moved to a desired position along the length of the back support, and then be tightened to secure the edge support 23 to the back support (e.g., via a handscrew knob 50).

In an example, the edge support 23 may also include threaded adjustment knobs (not shown) in openings 64 which may be tightened/loosened to secure against the edge of the canvas.

Figure 16:
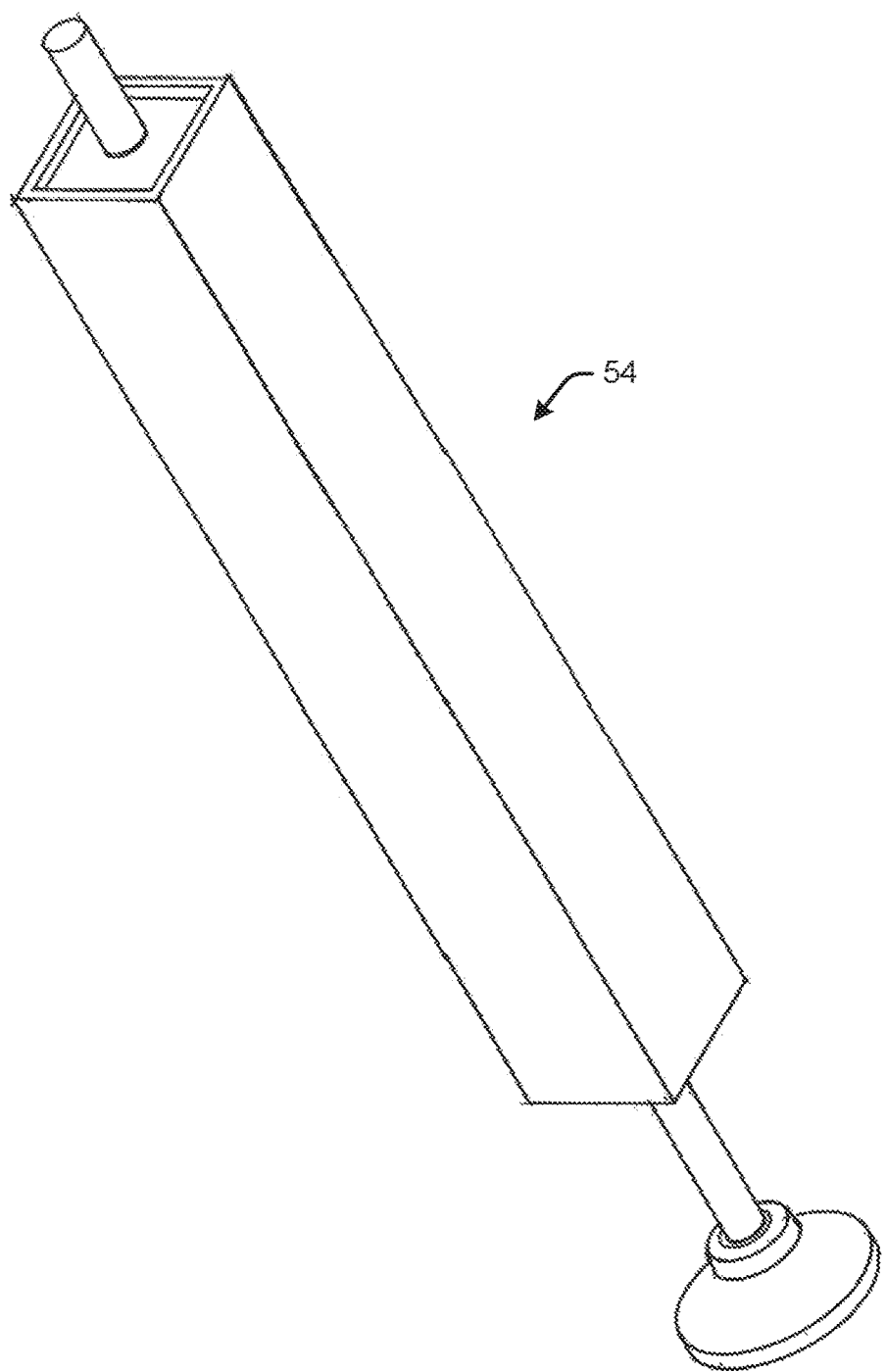
FIG. 16 is a detailed perspective view of an example floor support which may be mounted to the modular artist studio easel system to provide support in a horizontal position.

FIG. 16 is a detailed perspective view of an example floor support 54 which may be mounted to the modular artist studio easel system 10 to provide support in a horizontal position. In an example, the support arms 16a, 16b may be removed, and the entire canvas supporting assembly (e.g., back supports 20a-c) can be pivoted to be laid on its back (e.g., so that the back supports 20a-c are substantially parallel to the base members 12a, 12b). Floor supports 54 may be installed in the upper interconnection assemblies 42 (see, e.g., opening 55 in FIG. 8) on one end, and on the floor on the other end, to provide support in the substantially horizontal position. In this position, an artist may work above the canvas.

It is noted that the examples shown and described are provided for purposes of illustration and are not intended to be limiting. Still other examples are also contemplated.

The invention claimed is:

1. A modular artist studio easel system, comprising:
   at least a first base member and a second base member;
   at least a first mast member and a second mast member, the first mast member pivotally attached to the first base member, and the second mast member pivotally attached to the second base member;
   at least a first support arm and a second support arm, the first support arm pivotally attached between the first base member and the first mast member, and the second support arm pivotally attached between the second base member and the second mast member;
   at least a first cross member and a second cross member slidably connected between the first mast member and the second mast member to adjust a width between the first mast member and the second mast member;
   at least a first back support mounted to the first mast member, and a second back support mounted to the second mast member, the first back support and the second back support for supporting at least one canvas thereon;
   at least a first upper edge support and a first lower edge mounted on the first back support for supporting a top portion of canvas; and
   at least a second upper edge support and a second lower edge mounted on the second back support for supporting a bottom portion of canvas.

2. The modular artist studio easel system of claim 1, further comprising an easel area formed on the first and second back supports and between the upper and lower edge supports.

3. The modular artist studio easel system of claim 2, wherein the easel area accommodates different sizes of the at least one canvas thereon.

4. The modular artist studio easel system of claim 2, wherein the easel area accommodates a plurality of canvases thereon.

5. The modular artist studio easel system of claim 2, further comprising a plurality of locking mechanisms to secure a height and width of the easel area.

6. The modular artist studio easel system of claim 1, further comprising at least a first upper interconnection assembly and a second upper interconnection assembly.

7. The modular artist studio easel system of claim 6, wherein the first and second upper interconnection assemblies are configured to slidably mount the mast members substantially perpendicular to the cross members for both vertical and horizontal adjustment relative to one another.

8. The modular artist studio easel system of claim 1, further comprising at least a first lower interconnection assembly and a second upper interconnection assembly.

9. The modular artist studio easel system of claim 8, wherein the first and second lower interconnection assemblies are configured to slidably mount the mast members substantially perpendicular to the cross members for both vertical and horizontal adjustment relative to one another.

10. The modular artist studio easel system of claim 1, wherein each of the first base member and the second base member positioned substantially parallel to one another and substantially horizontal to a foundation surface.

11. The modular artist studio easel system of claim 1, wherein the first support arm and the second support arm adjustable in length to adjust an angle between the first mast member and the first base member and between the second mast member and the second base member.

12. The modular artist studio easel system of claim 1, wherein the first support arm is pivotally attached between the first base member and the first mast member, and the second support arm is pivotally attached between the second base member and the second mast member.

13. The modular artist studio easel system of claim 1, wherein at least one of the first upper edge support and the first lower edge support is slidably mounted on the first back support to adjust a height for the at least one canvas.

14. The modular artist studio easel system of claim 1, wherein at least one of the second upper edge support and the second lower edge support is slidably mounted on the second back support to adjust a height for the at least one canvas.

15. A modular artist studio easel system, comprising:
  at least a first base member and a second base member, each of the first base member and the second base member positioned substantially parallel to one another and substantially horizontal to a foundation surface;
  at least a first mast member and a second mast member, the first mast member pivotally attached to the first base member, and the second mast member pivotally attached to the second base member;
  at least a first support arm and a second support arm, the first support arm pivotally attached between the first base member and the first mast member, and the second support arm pivotally attached between the second base member and the second mast member, the first support arm and the second support arm adjustable in length to adjust an angle between the first mast member and the first base member and between the second mast member and the second base member;
  at least a first cross member and a second cross member slidably connected between the first mast member and the second mast member to adjust a width between the first mast member and the second mast member;
  at least a first back support mounted to the first mast member, and a second back support mounted to the second mast member, the first back support and the second back support for supporting at least one canvas thereon;
  at least a first upper edge support and a first lower edge, wherein at least one of the first upper edge support and the first lower edge support is slidably mounted on the first back support to adjust a height for the at least one canvas;
  at least a second upper edge support and a second lower edge, wherein at least one of the second upper edge support and the second lower edge support is slidably mounted on the second back support to adjust a height for the at least one canvas.

16. The modular artist studio easel system of claim 15, further comprising an easel area formed on the first and second back supports and between the upper and lower edge supports.

17. The modular artist studio easel system of claim 16, wherein the easel area accommodates different sizes of the at least one canvas thereon.

18. The modular artist studio easel system of claim 16, wherein the easel area accommodates a plurality of canvases thereon.

19. The modular artist studio easel system of claim 16, further comprising a plurality of locking mechanisms to secure a height and width of the easel area.

20. A modular artist studio easel system, comprising:
  at least a first base member and a second base member, each of the first base member and the second base member positioned substantially parallel to one another and substantially horizontal to a foundation surface;
  at least a first mast member and a second mast member, the first mast member pivotally attached to the first base member, and the second mast member pivotally attached to the second base member;
  at least a first support arm and a second support arm, the first support arm pivotally attached between the first base member and the first mast member, and the second support arm pivotally attached between the second base member and the second mast member, the first support arm and the second support arm adjustable in length to adjust an angle between the first mast member and the first base member and between the second mast member and the second base member;
  at least a first cross member and a second cross member slidably connected between the first mast member and the second mast member to adjust a width between the first mast member and the second mast member;
  at least a first back support mounted to the first mast member, and a second back support mounted to the second mast member, the first back support and the second back support for supporting at least one canvas thereon;
  at least a first upper canvas edge support and a first lower canvas edge, wherein at least one of the first upper canvas edge support and the first lower canvas edge support is slidably mounted on the first back support to adjust a height for the at least one canvas;
  at least a second upper canvas edge support and a second lower canvas edge, wherein at least one of the second upper canvas edge support and the second lower canvas edge support is slidably mounted on the second back support to adjust a height for the at least one canvas; and
  an easel area formed on the first and second back supports and between the upper and lower canvas edge supports, wherein the easel area accommodates different sizes and/or number of canvas thereon.

* * * * *